United States Patent

[11] 3,581,930

[72] Inventor Harry J. Gunnink
 12643 North 30th Drive, Phoenix, Ariz. 85029
[21] Appl. No. 791,652
[22] Filed Jan. 16, 1969
[45] Patented June 1, 1971

[54] THERMAL FORMED PLASTIC COVER FOR BULK MILK CONTAINERS
 3 Claims, 7 Drawing Figs.

[52] U.S. Cl. .................................. 220/72, 220/42, 220/94, 222/541
[51] Int. Cl. .................................. B65d 47/10, B65d 43/08, B65d 25/28
[50] Field of Search .................................. 150/.5; 220/42 A, 72, 74, 94, 95; 222/465, 541, 567

[56] References Cited
UNITED STATES PATENTS
| 829,477 | 8/1906 | Kruse | 220/72X |
| 1,757,475 | 5/1930 | Pratt | 220/95X |
| 2,780,385 | 2/1957 | Tupper | 150/.5 |
| 2,953,285 | 9/1960 | McKelvey | 222/567 |
| 3,237,552 | 3/1966 | Cronheim | 220/94X |
| 3,256,975 | 6/1966 | Puente | 220/72X |
| 3,363,811 | 1/1968 | Geist | 222/541 |
| 3,375,949 | 4/1968 | Hidding | 220/94 |

Primary Examiner—Robert B. Reeves
Assistant Examiner—Frederick R. Handren
Attorney—William H. Dean ABSTRACT: A thermal formed plastic cover for bulk milk containers particularly for use in connection with the upper open ends of rectangular bulk milk containers; the cover being thermal formed of a single thin sheet of plastic, such as polystyrene, and having four edges adjacent to which thermal formed reinforcing channels are disposed and extended in offset relation to the plane of the sheet so as to provide a lightweight economical cover which has sufficient strength to support a handle for carrying the container full of liquid.

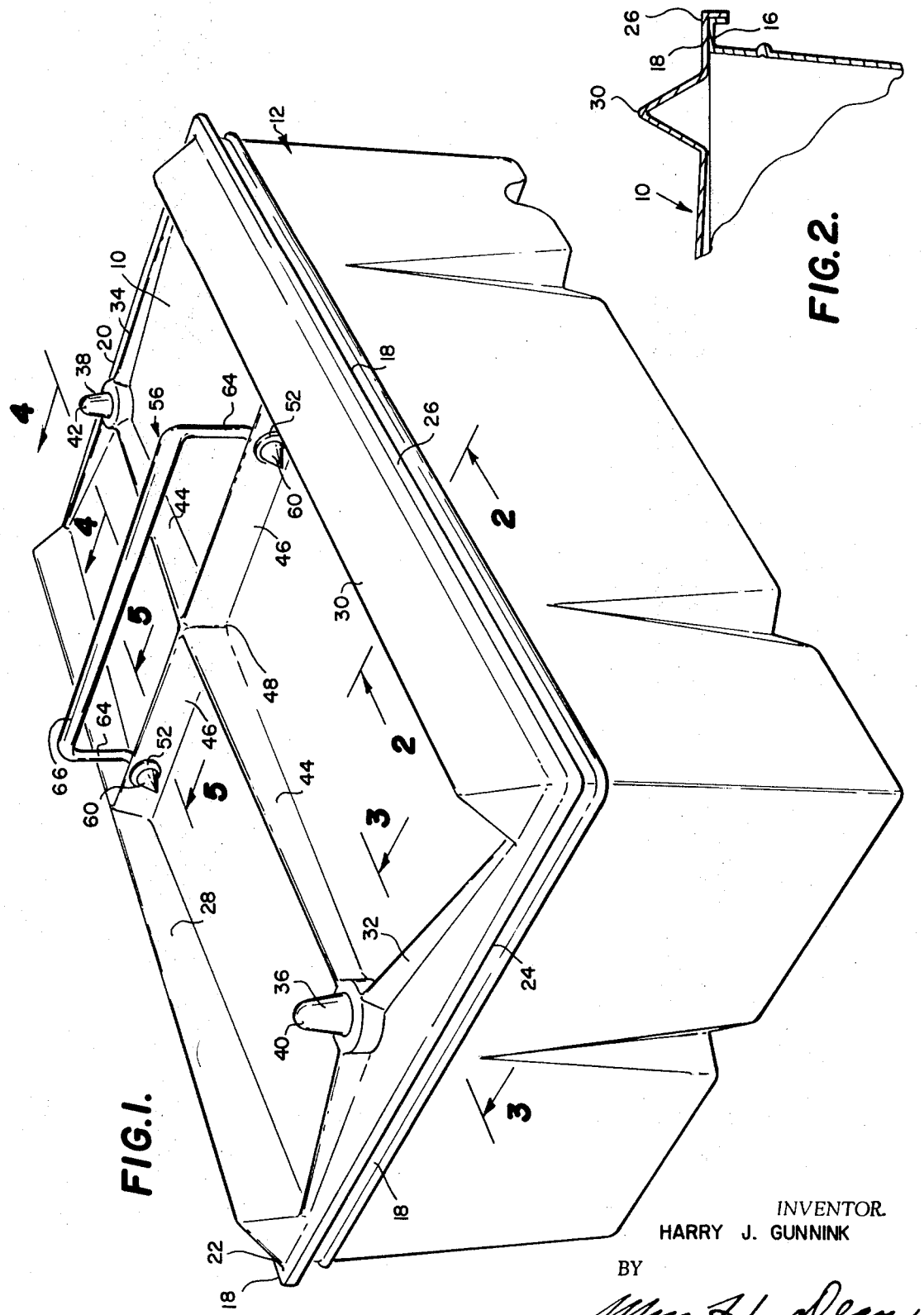

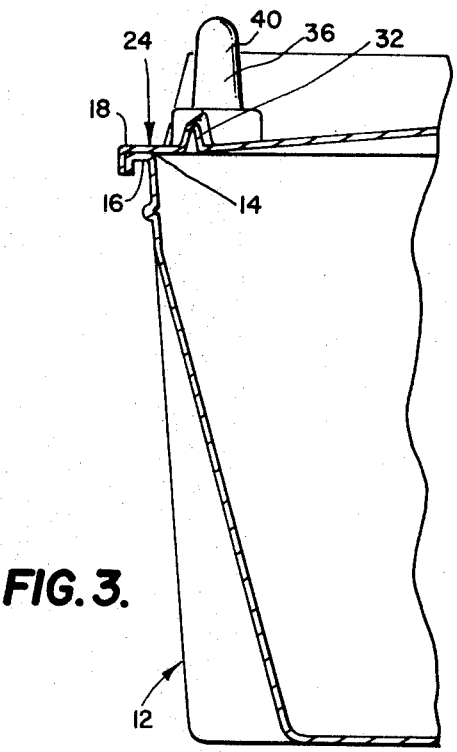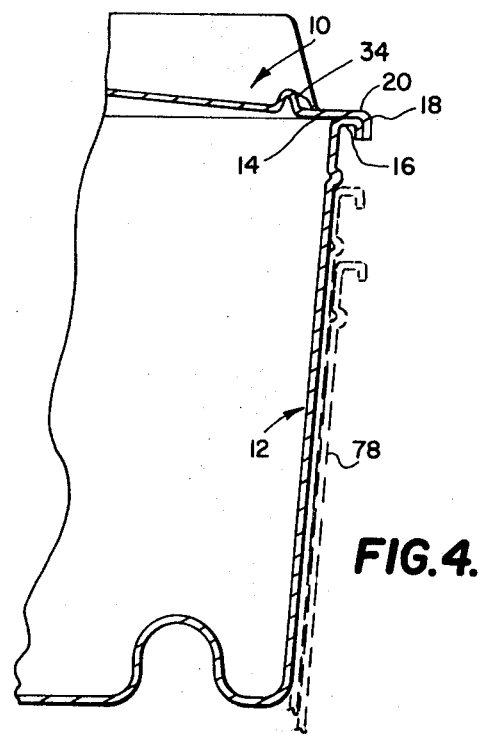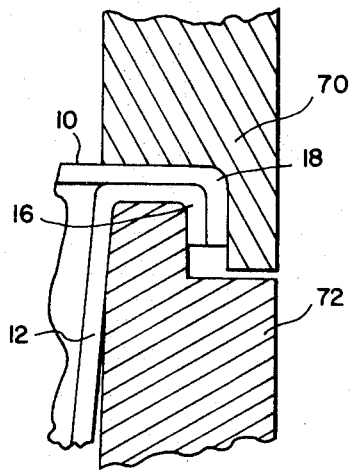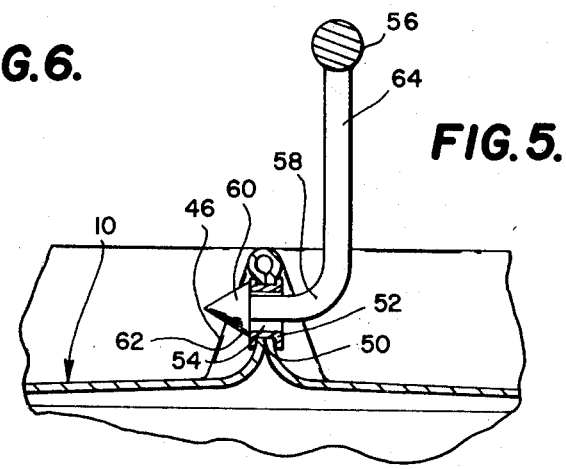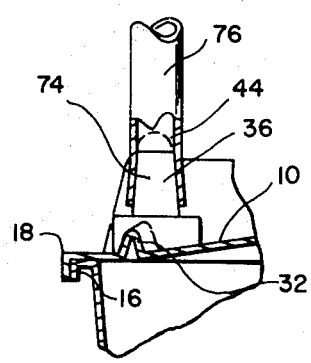

3,581,930

1

THERMAL FORMED PLASTIC COVER FOR BULK MILK CONTAINERS

BACKGROUND OF THE INVENTION

Various bulk milk containers have been blow molded of thin polystyrene, and many of these are provided with relatively large container bodies and very small necks having small covers and small openings which pose a substantial problem in the bulk handling of the empty containers, as well as the bulk filling thereof with liquid products such as milk or other beverages. Most of the prior art blow molded bulk milk containers, for example, may hold as much as one-half gallon of liquid or more, and due to the fact that these containers having small necks and small openings, they are very bulky in storage and cannot be telescopically nested with each other to afford economy in the handling and shipping of such containers. Additionally, the small neck opening requires that very accurate and careful attention must be paid to the assembly line filling of such containers with various liquids, such as milk or other beverages.

SUMMARY OF THE INVENTION

The present invention comprises a thermal formed plastic cover for bulk milk containers, and particularly a rectangular cover adapted to provide an enclosure for a rectangular milk container having an upper open end and having tapered sidewalls so as to provide for economical bulk handling of the containers, as well as very convenient filling of the containers preliminary to the placement of the cover thereon. The cover of the invention being formed of a single thin sheet of plastic material, such as polystyrene, the cover being subject to the conventional vacuum thermal forming method to provide offset channel-shaped reinforcing portions adjacent the edges of the cover and throughout the intermediate areas of the cover so as to stiffen the cover greatly and to permit a handle to be connected thereto for convenient handling of the entire container by connection of the handle with the cover. This construction of the invention is such as to provide for most efficient use of the very thin plastic material to attain rigidity and strength of the container cover for handling a filled container, and for also providing an integral pouring spout in the cover.

Accordingly, it is an object of the present invention to provide a thermal formed plastic cover for bulk milk containers which may be made of a single flat sheet of plastic material, such as polystyrene or the like, and which may be vacuum thermal formed of very thin sheet plastic material to provide a very rigid and strong cover for sealingly enclosing the upper open end of an upwardly diverging wall structure of a rectangular bulk milk container, and to thereby provide not only a rigid enclosure and integral spout structure for pouring liquid from the container, but also to provide a strong cover sufficiently rigid to carry a handle for supporting the entire cover and filled container while pouring liquid therefrom.

Another object of the invention is to provide a very simple and economical and readily expendable thermal formed plastic cover for bulk milk containers.

Another object of the invention is to provide a thermal formed plastic cover for bulk milk containers having a novel construction comprising a single thin sheet of thermal formed plastic provided with novel offset reinforcing channel portions adjacent the four respective edges of the cover to provide optimum economy in the use of the materials to attain sufficient strength for supporting a container handle capable of lifting the cover with a liquid filled contained attached thereto and for handling the same during pouring operations as liquid is being poured from the container.

Further objects and advantages of the invention may be apparent from the following specification, appended claims, and accompanying drawings:

BRIEF DESCRIPTION OF THE DRAWINGS

FIG. 1 is a perspective view of a thermal formed plastic cover for bulk milk containers shown enclosing an upper open end of a generally rectangular bulk milk container;

2

FIG. 2 is a fragmentary sectional view taken from the line 2-2 of FIG. 1;

FIG. 3 is a fragmentary sectional view taken from the line 3-3 of FIG. 1;

FIG. 4 is a fragmentary sectional view taken from the line 4-4 of FIG. 1, and showing by broken lines the relative nested relationship of a plurality of containers on which the thermal formed plastic cover of the invention may be disposed in heat-sealed connected relation;

FIG. 5 is an enlarged fragmentary sectional view taken from the line 5-5 of FIG. 1, showing a handle connection structure in relation to the plastic milk container cover of the invention;

FIG. 6 is a view taken substantially on the same plane as FIG. 2, showing a cross section of the respective edges of the cover of the invention and a container enclosed thereby, and further showing heat sealing dies adapted to heat seal the plastic cover onto flange structure of a bulk container; and FIG. 7 is a fragmentary sectional view similar to FIG. 3, but showing a spout portion of the container cover of the invention and illustrating by broken lines an enclosed portion of the spout portion cut away to permit the placement of a female fitting over the spout portion for convenience in pouring liquid from the container enclosed by the cover of the invention.

DESCRIPTION OF THE PREFERRED EMBODIMENTS

As shown in FIG. 1 of the drawings, the invention relates to a cover 10 which is specifically a thermal formed plastic cover for bulk milk containers or for other liquid containers of comparable configuration.

The cover 10 is specifically adapted for use in connection with rectangular milk containers, such as a container designated 12 in FIG. 1 of the drawings. This container is provided with downwardly converging sides adapted to be disposed in nested relationship with each other, as shown in FIG. 4 of the drawings, to provide for economy in the transportation of such bulk containers and also such large open top containers are readily and easily filled on a production line basis as compared to the usual difficulty in filling containers having small open necks. Additionally, it will be appreciated by those skilled in the art that the large open top bulk containers, when nested as shown in FIG. 4 of the drawings, provide for substantial shipping and inventory economy, as well as automation in the handling thereof preliminary to the filling and during the disposition of such containers in relation to conveyors or the like.

The container 12, as shown in FIGS. 3 and 4, is provided with an open top portion 14 which is enclosed by the cover 10 of the invention.

The cover 10 of the invention is preferably made of a thin single sheet of thermal formable plastic, such as polystyrene sheet material, and this cover 10 may be produced in the conventional thermal forming vacuum process, or any other suitable process, such as may be employed to form the thin structure of the single sheet of material into a very rigid and strong cover in accordance with the present invention.

It will be seen that the container 12 is provided with outwardly and downwardly extending flange structures 16 at its four respective edges, and that the cover 10 is provided with outwardly and downwardly extending flange structure 18 overlying and conforming with the flange structures 16 so as to enclose the open upper end 14 of the container 12. The flange structure 18 of the cover is disposed at the four respective edges which are designated 20, 22, 24 and 26 in FIG. 1 of the drawings.

The single sheet cover member 10 adjacent the edges 22 and 26 is provided with longitudinal channel portions 28 and 30, respectively, which are offset from the general plane or median area of the cover 10. This offset relation being shown best in FIG. 2 of the drawings, wherein the channel portion 30 is shown in cross section and is a generally inverted V-shaped cross-sectional channel. This cross-sectional shape being by way of example only, and may be varied. However, the lateral extension of the channel section 30 greatly stiffens the single sheet structure of the cover so as to permit the use of thin plastic and to provide for efficient use of the material to attain a very rigid and stiff cover having the structural characteristics, as will be hereinafter described.

Thus, the channel portions 28 and 30 normally are offset upwardly from the general plane of the single sheet cover member 10, and extend longitudinally along the longest sides of the cover at the edges 18, the longest sides being adjacent the longest edges 22 and 26.

Additional offset channel portions 32 and 34 are located adjacent the edges 24 and 20, respectively, and these channel portions 32 and 34 are of a cross-sectional shape, as shown in FIGS. 3 and 4, respectively. The cross-sectional shape being an inverted V-shaped upwardly disposed channel structure similar to the channel structures or channel portions 28 and 30, shown in FIG. 2 of the drawings. However, these channel portions 32 and 34 are adjacent the relatively shorter sides and edges 24 and 20, respectively, of the cover 10, and are therefore of lesser or generally lower dimensional character.

At an intermediate portion of each of the channel portions 32 and 34 is an upwardly disposed and upwardly converging hollow cylindrical spout portion. These portions being designated respectively 36 and 38, and each spout portion having a substantially spheroid enclosed end, the respective ends being designated 40 and 42. These ends 40 and 42 are adapted to be clipped off, as indicated by broken lines 44 in FIG. 7, to enable pouring from each of the spout portions 36 or 38, as desired.

Opposite ends of the channel portions 32 and 34 extend to and between the respective channel portions 28 and 30, as shown in FIG. 1 of the drawings, and thus all four edges 20, 22, 24 and 26 are reinforced in angular relation to each other.

Intermediate channel portions 44 and 46 are similar in cross section to the channel portions 28 and 30 and extend upwardly from the general plane of the single sheet cover member. These channel portions 44 and 46 intersect at a median portion 48 of the cover member, and the channel portion 44 intersects the channel portions 32 and 34, while the channel portion 46 extends from side to side between the channel portions 28 and 30.

These channel portions 44 and 46 are substantially inverted V-shaped in cross-sectional channel portions similar to the channel portions 28 and 30, and the channel portion 46 at locations near the channel portions 28 and 30 are pinched together and perforated at 50 to receive sealed cylindrical and flanged grommets 52 which have a central bore 54 extending therethrough.

The general cross-sectional shape of the channel portion 46 being V-shaped, as indicated in FIG. 5, and the locus of the sidewalls of the channel portion 46 through which the grommet 52 extends are pieced together when the grommet 52 is sealed therein.

A handle 56 is provided with downwardly extending ends 58 having generally conically-shaped locking bayonet ends 60. These bayonet ends 60 having a perimeter portion 62 which is slightly compressible and which, when forced through the bore 54 of the respective grommet 52, locks on the opposite sides thereof to prevent removal of the handle which extends at shank portions 64 at a right angle to the bayonet lock portions 60 so that an intermediate portion 66 of the handle may be grasped by a person's hand to carry the container 12 by means of the cover 10 which is rigidly reinforced by the hereinbefore mentioned offset channel portions of the cover 10.

The grommets 52 are located in the channel portion 46 adjacent to the channel portions 28 and 30 which are deep channels extending a considerable distance above the plane of the cover member, as shown in FIG. 2 of the drawings, and thus substantial strength at this location is available for utilizing the handle 66 to raise the cover with the container 12 attached and filled with liquid.

As shown in FIG. 6 of the drawings, the flange portion 18 of the cover 10 may be secured by a heat-sealing process to the flange structure 16 of the container 12 by means of heat-sealing dies 70 and 72.

The spout portions 36 and 38, as shown in FIGS. 1, 3, 4 and 7, may be clipped off at 44, as shown in FIG. 7, and the externally tapered surface 74 of each spout portion may be engaged by a jamb tapered fit into the interior of a female fitting 76 which may constitute a pouring spout extension or a tubular structure adapted to conduct liquid from the spout portion 36, as desired.

In the disclosure of FIG. 4, it will be seen that broken lines 78 illustrate the relative nesting of a plurality of the containers 12 merely to show the advantage of the large rectangular cover 10 of thin thermal formed plastic sheet in accordance with the invention. The cover being capable of enclosing the entire upper open end of such a tapered wall container so that the tapered wall container initially may be stacked in nested relation with a plurality of other similar containers and may be readily filled through its entire open top area and heat sealed at its flanges to the cover 10 of the invention to provide a very efficient, economical and strong bulk liquid or milk container having optimum economy and being particularly adapted to automation in the handling of the containers, the filling of the containers and the covering of the containers, as well as the subsequent efficient handling of the containers by the customer for pouring liquid therefrom. Additionally, it will be seen that the reinforcing of the inverted channel portions 28 and 30 permits stacking of these containers to a reasonable extent due to the rigidity of the channel structure potions 28 and 30, and due to the rigid tapered sidewall structure of the respective containers 12.

It will be obvious to those skilled in the art that various modifications may be resorted to without departing from the spirit of the invention.

I claim:

1. In a thermal formed plastic cover for bulk milk containers, the combination of: a single sheet cover member generally rectangular in form and adapted to enclose the upper open portion of a bulk milk container; said sheet cover member of thin sheet plastic material and having four edge portions, two of said edge portions being longer than the remaining two of said edge portions; first thermal formed reinforcing channel portions integral with and offset from the general plane of said sheet cover, one of said first channel portions being disposed adjacent each of said edge portions, said first channel portions adjacent said longer edges being relatively deeper than said first channel portions adjacent said remaining two of said edges; and a plurality of second thermal formed channel portions integral with said sheet and offset relative to the general plane thereof, said second channel portions extending across an intermediate portion of said sheet cover member and extending to said first channel portions; said second channel portions intersecting and crossing each other at said intermediate portion of said sheet cover member, said four edge portions disposed to be secured to an upper open portion of a container.

2. The invention, as defined in claim 1, wherein said second channel portions are provided with spaced-apart openings therein and further including a handle having opposite bayonet locking ends extended through said openings and locked therein such that said handle extends across and above said intermediate portion of said sheet cover members.

3. The invention, as defined in claim 2, wherein said openings are provided with seal grommets therein and said bayonet locking ends are frictionally locked in said seal grommets.